United States Patent [19]

Moon et al.

[11] Patent Number: 5,586,621
[45] Date of Patent: Dec. 24, 1996

[54] SAFETY CHOCKS FOR BOAT TRAILERS AND THE LIKE

[76] Inventors: Tracy L. Moon, 1524 Wolfsnare Rd., Virginia Beach, Va. 23451; Lewis C. Schlener, 1718 Sunset Pl., Ft. Myers, Fla. 33901

[21] Appl. No.: 544,259

[22] Filed: Oct. 16, 1995

[51] Int. Cl.$^6$ ....................................... B60T 3/00
[52] U.S. Cl. ............................. 188/4 R; 188/32
[58] Field of Search ................... 188/4 R, 32; D12/217; 410/30

[56] References Cited

U.S. PATENT DOCUMENTS

| | | | |
|---|---|---|---|
| 2,386,595 | 10/1945 | Connell et al. | 188/4 R |
| 2,522,104 | 9/1950 | Edwards | 188/32 |
| 3,444,963 | 5/1969 | Davis | 188/32 |
| 3,664,466 | 5/1972 | Rotheiser | 188/32 |
| 3,800,917 | 4/1974 | Vick | 188/32 |
| 3,810,530 | 5/1974 | Jay | 188/32 |
| 4,917,219 | 4/1990 | Henry | 188/32 |

*Primary Examiner*—Robert J. Oberleitner
*Assistant Examiner*—Chris Schwartz
*Attorney, Agent, or Firm*—Harry I. Leon; Vivian L. Steadman

[57] ABSTRACT

A pair of wheel safety chocks for blocking the rear wheels of a vehicle having a boat trailer or the like in tow, the safety chocks being connected together by a rope which, in use, is positioned so that it passes over the trailer hitch and between it and the vehicle bumper. So positioned, the rope is long enough to allow the chocks to block both rear wheels simultaneously. Moreover, without anyone repositioning either the chocks or the rope, the rope interacts with the vehicle bumper, as the vehicle is being driven forward, releasing the safety chocks and pulling them out of the path of the wheels of the oncoming trailer.

3 Claims, 4 Drawing Sheets

SAFETY CHOCKS FOR BOAT TRAILERS AND THE LIKE

BACKGROUND OF THE INVENTION

During the launch of a boat using a trailer or, alternatively, while loading a boat on a trailer, it is often necessary to wedge safety chocks against the rear wheels of the towing vehicle. Otherwise, it may be drawn into the water.

According to the prior art, removal of these safety chocks is an operation requiring two people: a driver for the towing vehicle and a second person to remove the chocks, as the towing vehicle is being driven forward and before the trailer wheels can come into contact with them. Unfortunately, this approach creates a hazardous situation for the second person when he tries to get in between the towing vehicle and the trailer so that he can remove the chocks.

SUMMARY OF THE INVENTION

The object of this invention is to facilitate removal of safety chocks from the rear wheels of a vehicle with a trailer in tow as it is being moved, from a parked position, off of a loading/unloading ramp.

A further object of this invention is to provide a device that will automatically, and at an appropriate time, remove the safety chocks from the path of the oncoming trailer without either the driver getting out of the towing vehicle or a second person interjecting himself between it and the trailer.

In accordance with the present invention, there is provided a pair of safety chocks connected to each other by an elongated flexible member such as a rope. Each of the chocks comprises a prism-like block having at least two intersecting sidewalls disposed at an acute angle to each other, the acute angle being substantially less than a right angle. Moreover, the block defines a through opening for slideably engaging the rope, the opening extending between, and perpendicularly to, distal end faces of the block. The rope itself includes a pair of knots formed therein on either side of each chock for constraining its movements longitudinally along the rope.

Traversing each chock at or near the center of gravity thereof, the through opening preferably parallels an edge of the chock formed at the intersection of two sidewalls disposed at an acute angle to each other. When the chocks are employed to prevent the vehicle from rolling, one of these two sidewalls abuts the wheel itself and the other faces downwardly.

In use, after the trailer has been backed far enough down a boat ramp or the like, the pair of chocks is placed behind the rear wheels of the towing vehicle, each chock forming a wedge between one of its rear wheels and the ramp. Simultaneously, the rope is passed over the trailer hitch and threaded between its ball and the bumper of the towing vehicle.

After loading/launching the boat, no one has to remove the chocks manually. Rather, as the towing vehicle is being driven forward, the chocks are released automatically and then dragged by the towing vehicle out of the path of the trailer. Once the towing vehicle has been moved off of the ramp, the driver can simply retrieve the chocks and place them in storage for the next use.

DETAILED DESCRIPTION OF THE PREFERRED EMBODIMENT

Figure 1:
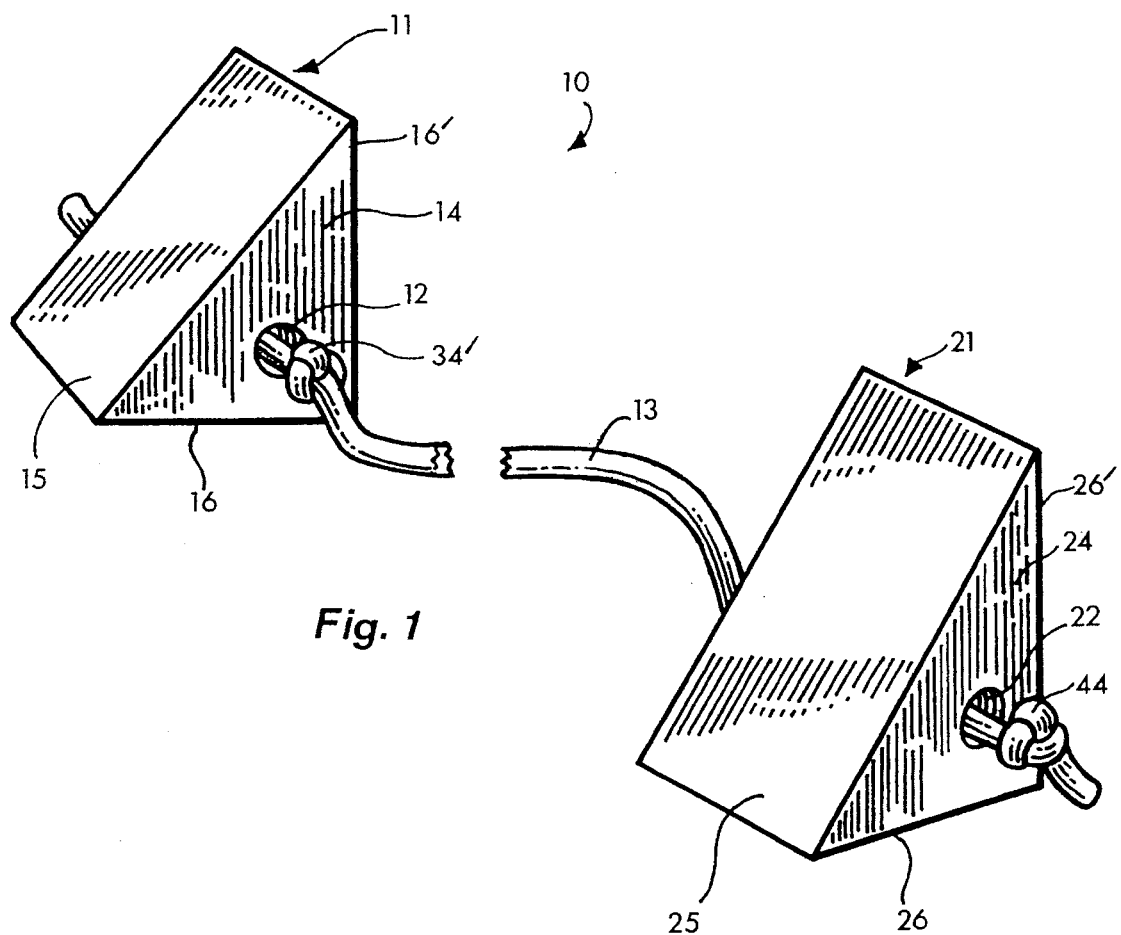
FIG. 1 is a perspective view of the safety chocks and connecting rope in accordance with the present invention, only fragments of the rope being shown for ease of illustration.
Figure 2:
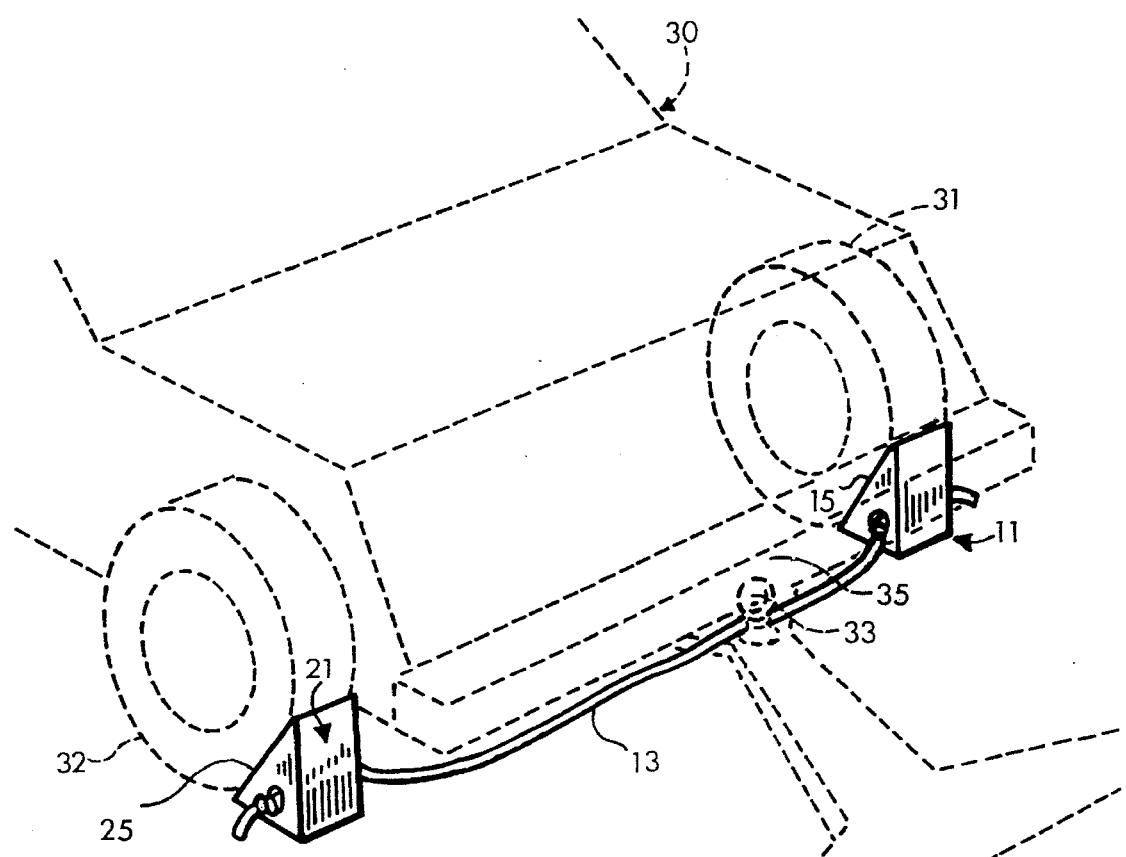
FIG. 2 is a perspective view, on a reduced scale, of the chocks and rope according to FIG. 1, the chocks being shown in position for use behind the rear wheels of a vehicle towing a trailer, the vehicle and trailer being illustrated by dashed lines.
Figure 3:
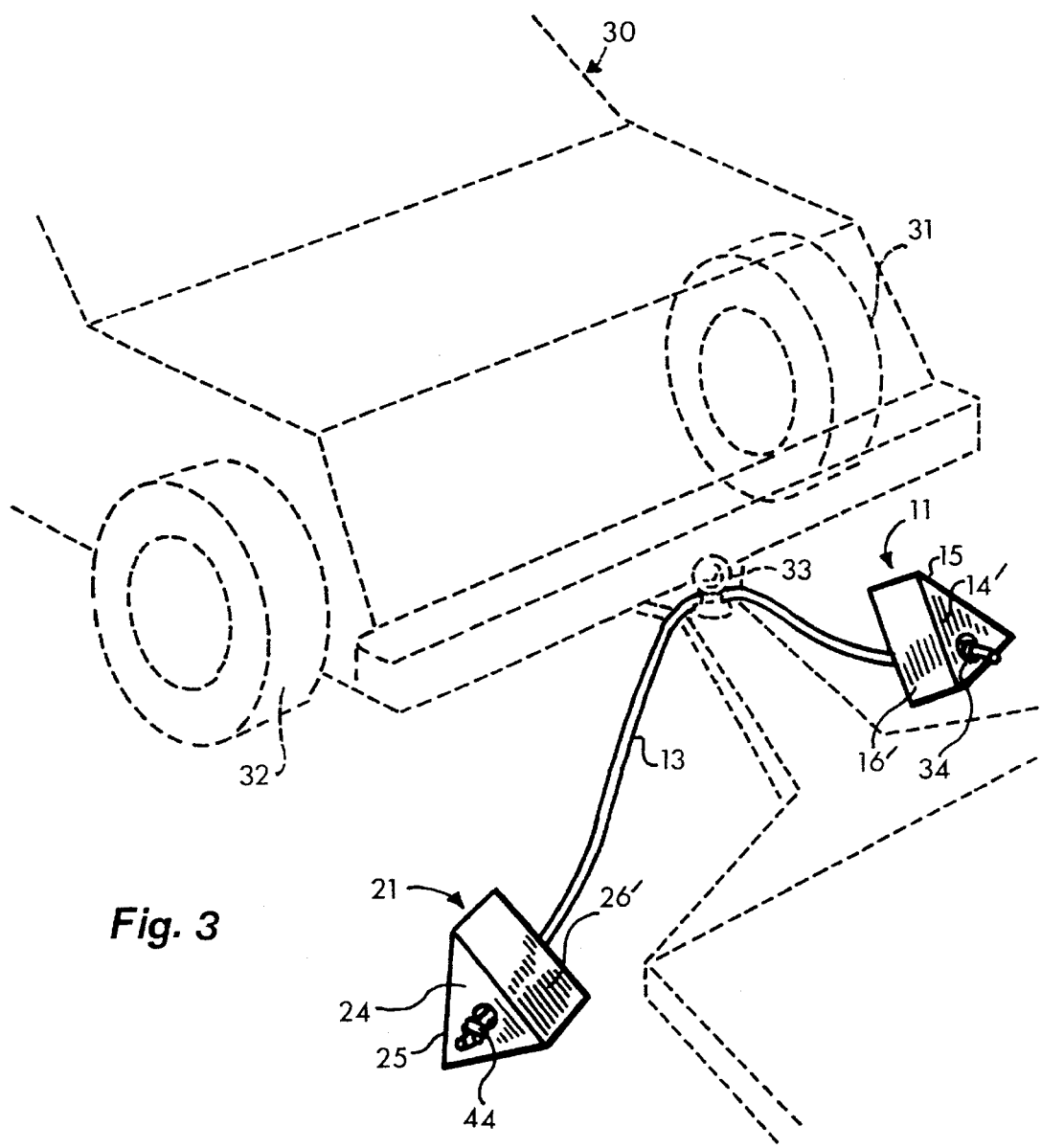
FIG. 3 is a perspective view, on a reduced scale, of the chocks and rope according to FIG. 1, the chocks being shown after the towing vehicle has been driven forward freeing the chocks and dragging them out of the path of the trailer, the vehicle and trailer being illustrated by dashed lines.
Figure 4:
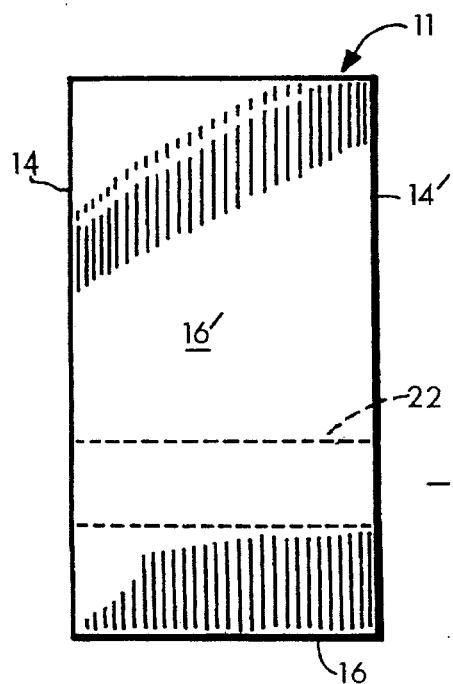
FIGS. 4 and 5 are plan and elevational views, respectively, on an enlarged scale, of one of the safety chocks, without the rope being inserted therethrough but otherwise according to FIG. 1.
Figure 5:
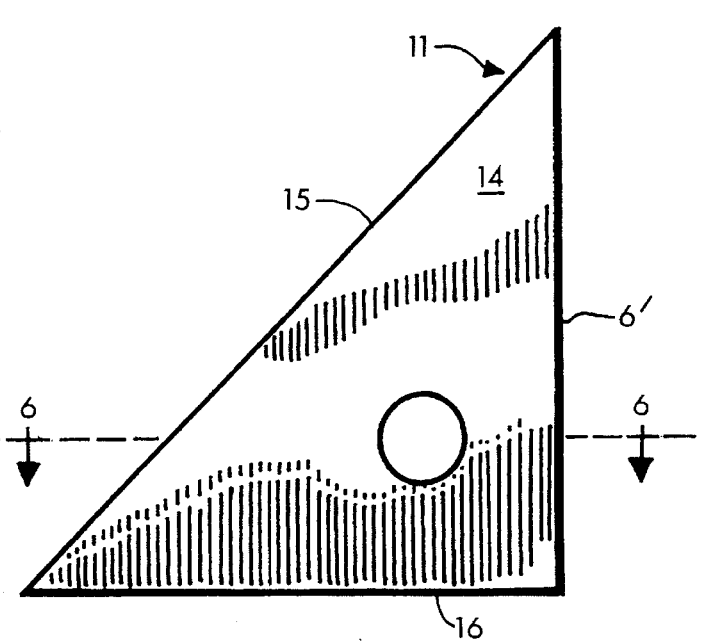
Figure 6:
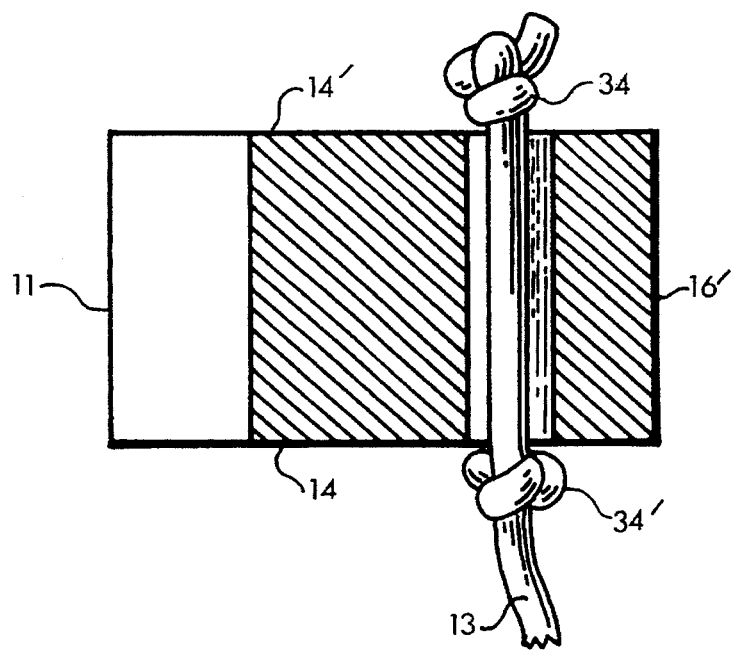
FIG. 6 is a cross-section taken along line 6—6 of FIG. 5, but with the rope being inserted through the safety chock and only a fragmentary portion of the rope being shown for ease of illustration.

Referring to the drawings, an apparatus having a pair of safety chocks 11, 21, referred to generally by the numeral 10, is shown installed behind the rear wheels 31, 32 of a towing vehicle 30 (FIG. 2). Interconnected to the other chock by a flexible line such as a rope 13, each safety chock 11, 21 comprises a prism with distal end faces 14, 14'; 24, 24' defining a through opening 12, 22, respectively, for receiving the rope. Movements of each chock 11, 21 along the rope 13 are constrained by knots 34, 34'; 44, 44' formed therein at both ends of the chock.

Made of hemp, nylon, polypropylene or the like, the rope 13 measures, by way of example, about 10 feet in length and about one-half inch in diameter. The safety chocks 11, 21 themselves are preferably right triangular prisms, about 5 inches in height by 3 inches in width, fabricated in such a way from plastic, metal, wood or the like way that they are strong, compact, lightweight and readily storable. Each prism is wedge-shaped, including at least two intersecting sidewalls 15, 16; 25, 26 that are disposed at an acute angle to each other, the acute angle being substantially less than a right angle. In the case of chocks 11, 21 which are right triangular prisms, as in the preferred embodiment, the chocks also include a second set of sidewalls 15, 16'; 25, 26' disposed at an acute angle to each other.

Once the towing vehicle 30 has been parked on a launching/loading ramp, the pair of chocks 11, 21 is placed, with the rope 13 passing over the trailer hitch, behind the rear wheels 31, 32 of the towing vehicle. With the sidewall 15, 25 of the chock 11, 21 abutting the rear wheel 31, 32, respectively, the chock forms a wedge between the rear wheel and the ramp in the event the vehicle begins to roll. By threading the rope 13 between the ball of the trailer hitch and the bumper of the towing vehicle 30, one also prepares the apparatus 10 so that chocks 11, 21 can be removed later, as the towing vehicle is being driven forward, without further effort on the part of either the driver or a second person.

With the rope 13 so threaded, the chocks 11, 21 are released automatically and dragged out of the path of the trailer, whenever the towing vehicle 30 begins to move up the ramp. Once the towing vehicle 30 has been moved off of the ramp, the driver can simply retrieve the chocks 11, 21 and place them in storage for the next use.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A method of removing wheel blocks from behind the rear wheels of a vehicle hitched to a trailer, comprising passing a flexible member connected to the blocks over the trailer hitch in such a way that when the vehicle moves forward, a portion of the flexible member moves with it, dragging the blocks out of the way of the trailer.

2. A method of blocking rear wheels of a vehicle hitched to a trailer, comprising:

(a) placing a pair of wedge-shaped blocks rearwardly of the rear wheels, each block abutting one of the wheels and forming a wedge beneath the wheel in the event the vehicle begins to roll backwards; and (b) passing a flexible member connecting the blocks over the trailer hitch, the flexible member being of sufficient length that when the flexible member is passed over the hitch, the blocks can be placed behind the rear wheels so as to prevent them from rolling backwards; the flexible member being passed over the hitch in such a way that when the vehicle moves forward, a portion of the flexible member moves with it, dragging the blocks out of the way of the trailer.

3. A device inserted behind a vehicle having two rear wheels, comprising:

(a) a pair of wedge-shaped blocks; and (b) an elongated flexible member having distal ends thereof connected to the blocks, the flexible member being of sufficient length that a mid-section thereof can be temporarily attached to the vehicle when one of the blocks is positioned behind each of the rear wheels in such a way as to prevent the vehicle from rolling backwards, the flexible member being temporarily attached to the vehicle in such a way that when the vehicle moves forward, a portion of the flexible member moves with it, dragging the blocks.

* * * * *